United States Patent [19]

Haushalter et al.

[11] Patent Number: 4,883,144

[45] Date of Patent: Nov. 28, 1989

[54] NOISE ABSORBING HOUSING FOR A BLENDER

[76] Inventors: Frederick W. Haushalter, 365 N. Detroit St., Kenton, Ohio 43326; John S. Robinson, 3200 S. Ala, Unit #130, St. Augustine, Fla. 32084

[21] Appl. No.: 240,712

[22] Filed: Aug. 26, 1988

[51] Int. Cl.⁴ .............................................. H02K 5/24
[52] U.S. Cl. ..................................... 181/198; 181/202
[58] Field of Search ......................... 181/198, 200–204

[56] References Cited

U.S. PATENT DOCUMENTS

| | | | |
|---|---|---|---|
| 1,443,688 | 1/1923 | Hurd | 181/200 X |
| 1,903,201 | 3/1933 | Steur et al. | 181/198 X |
| 3,881,569 | 5/1975 | Evans, Jr. | 181/200 |

Primary Examiner—B. R. Fuller

[57] ABSTRACT

A housing for enclosing motorized appliances consists of a structure constructed of noise absorbing materials. A door on the housing, when closed, activates internal circuitry for supplying power to the enclosed appliance. The housing absorbs much of the noise generated during operation of the appliance, allowing conversation and entertainment to continue in a normal manner without noise interruption from the appliance.

1 Claim, 2 Drawing Sheets

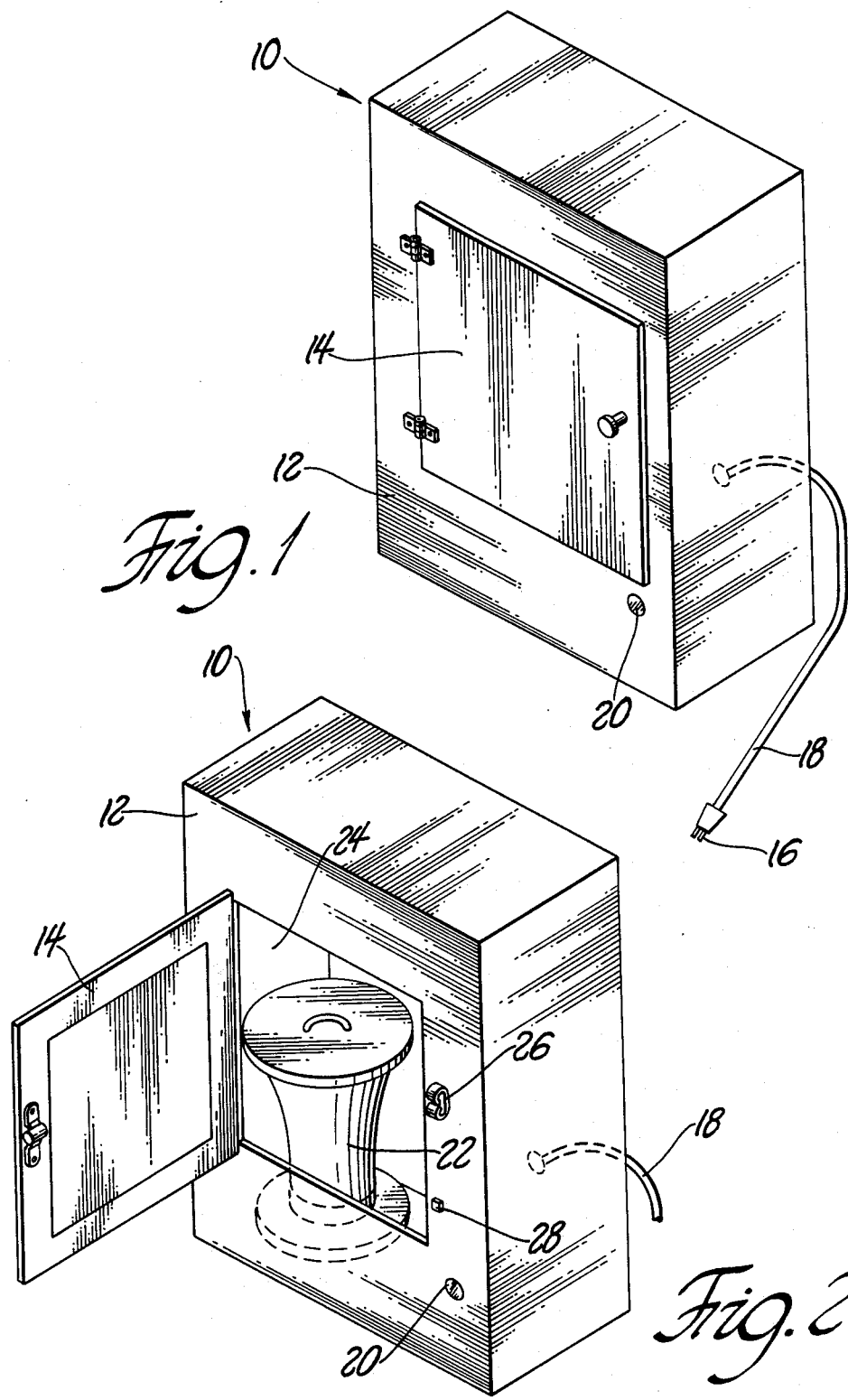

NOISE ABSORBING HOUSING FOR A BLENDER

Background of the Invention

This invention relates to a housing for the absorption of noise and more particularly to a noise absorbing housing in which to enclose and operate motorized stationary home appliances.

The desirability for noise control of machinery, particularly motorized small home appliances, has long been recognized. Often, when a motorized appliance is in operation, all conversation is temporarily interrupted. In addition, television and radio entertainment and doorbell and telephone sounds are masked when appliances are in operation. Prior art systems have attempted development of quieter motors, but with the accompanying high cost of development and lack of interchangeability between different appliances, these prior systems are unfeasible.

Summary of the Invention

This invention provides for a decrease in the noise level of motorized home appliances by enclosing such appliances in a noise absorbing housing which, with minimal alterations, can be adapted to enclose any appliance.

In the subject invention, the housing absorbs much of the noise generated by the operating appliance, thereby allowing the user to converse in a normal manner without having to raise his voice or pause the conversation to compensate for such noise. Because the subject invention provides for quiet operation of appliances, the user may also continue to listen to a radio or television without the aggravation of noise interruption so common from many household and restaurant appliances.

One situation in which the noise absorbing housing is especially desirous is in a nightclub or bar setting. In particular, mixing drinks in a blender enclosed in the housing of the subject invention would allow the bartender and patrons to continue conversing without the sudden and frequent interruption of noise generated by the operating blender. Likewise, use of the housing to enclose home appliances such as food processors, mixers and blenders would keep the appliance from masking such sounds as the telephone or doorbell.

Brief Description of the Drawing

The foregoing and other objects of this invention may best be understood by reference to the following description of a preferred embodiment and the drawing in which:

FIG. 1 is a front view of the housing showing the door closed;

FIG. 2 is a front view of the housing with the door open to display an appliance enclosed in the housing.

Description of the Preferred Embodiment

Figure 3:
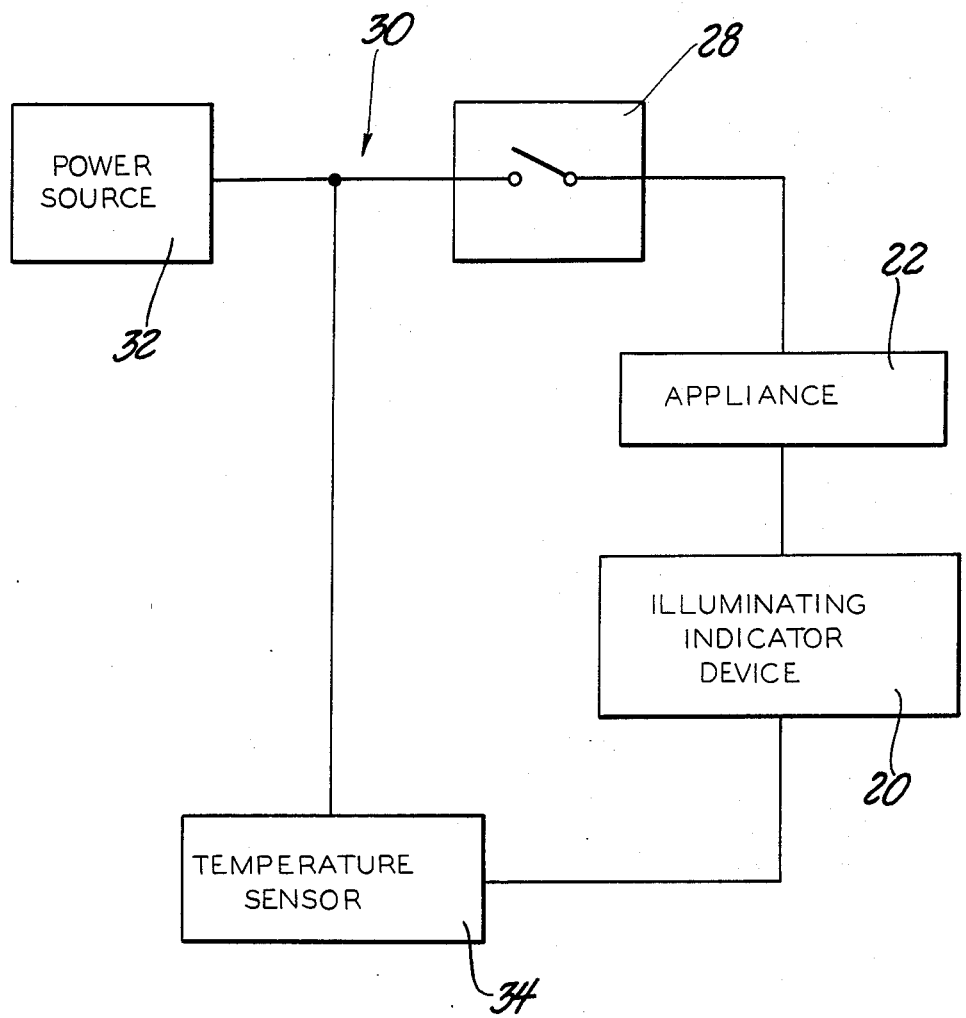
FIG. 3 is a block diagram illustrating the internal circuitry for supplying power to operate the enclosed appliance.

Referring to the drawings, and more particularly to FIG. 1, reference numeral 10 generally designates a noise absorbing housing for enclosing any motorized stationary appliance. The exterior structure 12 of the housing 10 may be constructed of any suitable noise absorbing material, such as two or more layers of stainless steel encasing a noise entrapping fabric.

In the preferred embodiment of this invention, structure 12 includes a hinged door 14, which may be constructed of the same noise absorbing materials as the rest of structure 12. Door 14 allows for access to the enclosed appliance. When door 14 is closed, as in FIG. 1, and conductors 16 of cord 18 are inserted into any suitable electrical outlet to establish contact, internal circuitry is activated to supply power for operating the enclosed appliance. In addition, indicator light 20 illuminates to indicate that the enclosed appliance is in operation.

Referring now to FIG. 2, housing 10 is shown with door 14 open to display an appliance 22 enclosed in housing 10. Appliance 22 of FIG. 2, a blender, is shown for illustrative proposes only and is not to be considered as limiting the scope of the invention.

In the preferred embodiment of this invention, appliance 22 is surrounded by an area of dead air space 24, effective for noise absorption. Structure 12 then encloses appliance 22 and space 24. When door 14 is closed and door latch 26 is engaged, switch 28 depresses to activate the internal circuitry to operate appliance 22.

The block diagram of FIG. 3 illustrates the internal circuitry, generally designated by reference numeral 30. In FIG. 3, power source 32 supplies power to switch 28 when switch 28 is in the closed position. When switch 28 is thus engaged, power is supplied to operate appliance 22 and indicator light 20 illuminates to indicate that appliance 22 is in operation. A further embodiment of the internal circuitry includes, as a safety feature, a temperature sensing device capable of overriding switch 28 and turning off the power to appliance 22 if the enclosed appliance is overheating. Temperature sensing device 34 may be any of a variety of temperature sensitive devices including a thermistor.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A noise absorbing housing for absorbing noise generated by blenders, the housing comprising:
    a structure composed of noise absorbing materials for enclosing the blender;
    a dead air within the structure and surrounding the enclosed blender, the space comprising an area for noise absorption;
    a door on the housing for allowing access to the blender wherein the blender is enclosed within the structure and surrounded by the area of dead air space;
    internal circuitry connectable to a power source for supplying power to the enclosed blender, wherein power is applied to operate the blender when the door is closed;
    an indicator light for indicating when the enclosed blender is in operation; and
    a temperature sensitive device for shutting off power to the enclosed blender if the blender is over-heating.

* * * * *